Patented Jan. 20, 1953

2,626,216

UNITED STATES PATENT OFFICE 2,626,216

BLOOM INHIBITED CHOCOLATE

Sherwood Thomas Cross, Elsmere, Del., assignor to Atlas Powder Company, Wilmington, Del., a corporation of Delaware No Drawing. Application June 6, 1951, Serial No. 230,255

19 Claims. (Cl. 99—23)

This is a continuation in part of application No. 172,199, filed July 5, 1950, now Patent No. 2,586,615. This invention relates to solid chocolate materials and chocolate coated products. More particularly it relates to confectionery chocolate suitable for the preparation of bars, enrobing, icings, and the like.

It is an object of the present invention to produce a chocolate which is color stable upon storage.

It is another object of the present invention to provide a process of treating chocolate for use as a candy confection or in the preparation of edible products such as candy confections and chocolate coated desserts which is stabilized against discoloration.

It is a further object of the present invention to provide an edible chocolate stabilized against discoloration which does not vary essentially in composition or physical properties from the conventional confectionery materials in commercial usage.

The discoloration of solid chocolate materials during storage is a matter of common experience. Chocolate bars and certain chocolate enrobed confections tend to fade and/or change in color under certain conditions of storage and composition. This phenomenon is known to the trade as "bloom." It may be a "low temperature bloom" which is a grey to light brown hue, or a more pronounced, very tan discoloration known as "high temperature bloom" which occurs under extreme temperative variations rendering the chocolate "heat struck." It is a cause of considerable financial loss and embarrassment among manufacturers of such materials. Contrary to popular opinion, "bloom" is not necessarily associated with "staleness." For instance, it has been found that temperature cycling and certain ingredient proportions are factors conducive to "bloom" formation. Thus, a product supplied to a retail merchant in a fresh and wholesome condition is often found to be so faded that its unpalatable appearance makes it unsuitable for sale.

The physical or chemical nature of the change which accompanies this unsightly phenomenon is not known. The taste and technical requirements of the industry preclude any substantial modifications of the chocolate compositions as currently employed. For instance, such a manufacturing process as enrobing is highly sensitive to the melting point and viscosity properties. Furthermore, foreign tastes must be avoided and the characteristic chocolate flavor must be preserved to the satisfaction of the consuming public.

In accordance with the present invention it has been discovered that by the incorporation of minor amounts of certain materials to be described hereinafter within a chocolate product, the tendency to "grey" or "bloom" is greatly reduced without any other noticeable effect upon the appearance or taste of the unstabilized material.

The term "chocolate product" as employed in this application is intended to include the solid or semiplastic food prepared by finely grinding cacao nibs and compositions wherein this material is an essential ingredient. Thus, within the expression is included such material commonly known as "chocolate liquor," "chocolate," "bitter chocolate," "baking chocolate," "cooking chocolate," "chocolate coating" and "bitter chocolate coating"; the alkali treated cacao products known as "Dutch chocolate"; chocolate, saccharine compositions known as "sweet chocolate" or "sweet chocolate coating"; "bittersweet chocolate," "bittersweet chocolate coating," "semisweet chocolate" or "semi-sweet chocolate coating" wherein the saccharine ingredient may be sucrose, dextrose, dried corn syrup and the like; and the chocolate liquor, milk solids, saccharine compositions commonly known as "milk chocolate," "sweet milk chocolate," "milk chocolate coating," "sweet milk chocolate coating," "skim milk chocolate," "buttermilk chocolate" and "mixed dairy product chocolates." Furthermore, compositions made from sweet chocolate or cocoa and fats other than cacao fat are intended by the generic term. In these latter compositions the cacao fat is replaced entirely or in part by one or a mixture of two or more vegetable food oils or fats other than cacao fat, which may be hardened or hydrogenated. Such coatings are employed primarily to obtain variations in melting point.

The chocolate and chocolate compositions as described above may contain additives as spice, ground vanilla beans, any natural food flavoring oil, oleoresin or extract, vanillin, ethyl vanillin, coumarin, or other artificial food flavoring, butter, milk fat, dried malted cereal extract, ground coffee, ground or whole nut meats, salt, and viscosity modifiers such as lecithin.

The stabilizing ingredient which is incorporated in accordance with the present invention comprises a combination of a lipophylic partial ester of a long chain fatty acid with a polyhydroxylic compound containing at least one hydroxyl group for every three carbon atoms and a hydrophilic compound of the formula:

$$R(OC_nH_{2n})_zOR'$$

wherein:

R is an aliphatic acyl radical containing at least 12 carbon atoms,
R' is hydrogen or an aliphatic acyl radical containing at least 12 carbon atoms,
n is 2 or 3, and
z is a number from 4 to 60.

The lipophilic partial esters of the fatty acids which are particularly effective are those containing at least 12 carbon atoms in the fatty acid radical, such as those obtainable by the hydrolysis of natural fats, oils, and waxes. Suitable polyhydroxylic compounds containing at least one hydroxyl group for every three carbon atoms include glycerol and polyglycerols; pentaerythritol; pentitols; hexitols and the cyclic ethers thereof; cyclitols such as inositol; oligosaccharides such as glucose, sucrose and lactose; and the glycol and lower polyglycol ethers of such polyhydroxylic compounds. Lipophilic partial esters of fatty acids containing from 12 to 18 carbon atoms such as those of lauric, palmitic, stearic and oleic acid with hexitols and the cyclic ethers thereof have been found particularly effective. These partial esters may be prepared by one of several known methods; such as by direct esterification of the polyhydroxy material with the free fatty acid or by alcoholysis of naturally occurring esters with polyhydroxy material, using suitable catalyst. The hydrophilic component as described above can be prepared either by direct esterification of a polyoxyalkylated diol with one or two mols of a fatty acid, a condensation of long chain fatty acid with an alkylene oxide or a mixture of alkylene oxides which may be then further esterified or a combination of the two processes to obtain both the esterification and the etherification linkages which are necessary. Derivatives suitable in the present invention include those containing an average of 4 to 60 oxyalkylene groups per mol. The preferred derivatives are the polyoxyethylene ether esters of the fatty acids containing from 12 to 18 carbon atoms and an average of 6 to 30 oxyethylene groups per mol. These compounds are well known to the art and their preparation will not be described in detail herein.

The combination of the lipophilic partial ester and the hydrophilic ether ester components, as described above, is preferably in the ratio of 1/1. However, either component may be present to as much as 30% of the mixture. It has been found that the ratios of 25/75; 50/50; and 75/25 of partial ester to polyoxyalkylated acid are particularly effective. These combinations are effected by simply mixing the components with stirring at room temperature in the desired proportions. The components are either oily liquids or waxy solids. If one or both components is a solid, the solid component is melted prior to combination followed by mixing with stirring at the elevated temperature. Concentration of the inhibitor may be as high as 5%, however, a preferred range is 0.5 to 1.0% based on the weight of chocolate composition.

In the preparation of the chocolate composition, a solid chocolate of conventional commercial origin is melted and the inhibitor is added in the liquid or molten state in the desired proportions with constant stirring. The mass is then tempered following the usual procedure. Such chocolate is available for the dipping of centers, or it may be cast into molds for the production of chocolate bars.

The following examples are cited to illustrate the invention. They are not intended to limit it in any way.

EXAMPLE I

A chocolate bar containing 1% of a mixture of sorbitan monostearate and *8 polyoxyethylene

* Indicates average number of oxyethylene groups per mol of acid.

stearate in a 75/25 ratio, is prepared by melting 300 grams of bittersweet chocolate at 50° C., and adding 3 grams of the stabilizer to the molten mass with constant stirring. The molten material is tempered by gradual cooling to 25.5° C., holding this temperature for ten minutes and raising to a holding temperature of 30° C. A bar 3¼ x 1¾ x ¼ inches is cast from the melt. The bar is passed through a cooling tower where the temperature of the entering air is 11° C. It is allowed to stand for 24 hours at 25° C. It is then subjected to an accelerated bloom test which comprises storage under temperatures alternately at 33° C. and 15° C. for periods of twelve hours at each temperature over a total of 48 hours. At the end of this time the bar shows no sign of bloom and excellent snap.

A sample without added inhibitor, treated identically and tested simultaneously exhibits decided surface bloom.

EXAMPLE II

Another bar containing 1% of a mixture of sorbitan monostearate and 8 polyoxyethylene stearate in a 40/60 ratio is prepared and tested following the procedure of Example I. No sign of bloom is apparent at the conclusion of the accelerated storage tests.

While the examples are limited to chocolate bars, it is apparent that the concept is available for much broader applications. Thus, the chocolate may be ground or in the form of chip or powder. Furthermore, it may be a coating applied to any form of edible product such as upon candy centers, cakes, fruit, ice cream and the like.

Among the various inhibiting agents which may be employed are the following as expressed in Table I.

*Table I*

| Lipophilic Component | Hydrophilic Component |
|---|---|
| Isosorbide monolaurate | 6 polyoxyethylene stearate |
| Isosorbide monostearate | 10 polyoxyethylene stearate |
| Sorbitan monoricinoleate | 20 polyoxyethylene distearate |
| Sorbitan triricinoleate | 4 polyoxyethylene oleate |
| Mannitan diricinoleate | 8 polyoxyethylene oleate |
| Soribitan monolaurate | 12 polyoxyethylene oleate |
| Sorbitan dilaurate | 8 polyoxyethylene palmitate |
| Sorbitan tristearate | 20 polyoxyethylene palmitate |
| Sorbitan monopalmitate | 40 polyoxyethylene palmitate stearate |
| Sorbide monopalmitate | 10 polyoxyethylene myristate |
| Sorbitan monooleate | 6 polyoxyethylene arachidate |
| Sorbitan trioleate | 4 polyoxypropylene stearate |
| Mannide monolaurate | 4 polyoxypropylene oleate |
| Mannitan trioleate | 4 polyoxypropylene palmitate |
| Propylene glycol monostearate | 6 polyoxypropylene stearate |
| Glycerol monostearate | 6 polyoxypropylene oleate |
| Glycerol distearate | 6 polyoxypropylene palmitate |
| Sorbitol monostearate dioleate | 4 polyoxypropylene, 4 oxyethylene stearate |
| Mannitol monostearate dioleate | 4 polyoxypropylene, 4 oxyethylene dioleate |
| Dulcitol monolaurate | 4 polyoxyethylene, 4 oxypropylene palmitate oleate |

It is understood, of course, that the various items in either column may be used in any com-

What is claimed is:

1. A composition of matter comprising chocolate and as a bloom inhibitor a mixture of a lipophilic partial fatty acid ester of a polyhydric compound containing at least one hydroxyl group for every three carbon atoms and a hydrophilic compound of the formula:

$$R(OC_nH_{2n})_zOR'$$

wherein:

R is an aliphatic acyl radical containing at least 12 carbon atoms,

R' is a member of the group of hydrogen and an aliphatic acyl radical containing at least 12 carbon atoms, n is an integer between 1 and 4, and z is a number from 4 to 60.

2. A composition of matter comprising chocolate and as a bloom inhibitor a mixture of a lipophilic partial fatty acid ester of a polyhydric compound containing at least one hydroxyl group for every three carbon atoms and a hydrophilic compound of the formula:

$$R(OC_nH_{2n})_zOH$$

wherein:

R is an acyl radical containing from 12 to 18 carbon atoms, n is an integer between 1 and 4, and z is a number from 4 to 60.

3. A composition of matter comprising chocolate and as a bloom inhibitor a mixture of a lipophilic partial ester of a fatty acid containing from 12 to 18 carbon atoms with glycerol and a hydrophilic compound of the formula:

$$R(OC_2H_4)_zOH$$

wherein:

R is an acyl radical containing from 12 to 18 carbon atoms, and z is a number from 6 to 30.

4. A composition of matter comprising chocolate and as a bloom inhibitor a mixture of a lipophilic partial ester of a fatty acid containing from 12 to 18 carbon atoms with a hexitol and a hydrophilic compound of the formula:

$$R(OC_2H_4)_zOH$$

wherein:

R is an acyl radical containing from 12 to 18 carbon atoms, and z is a number from 6 to 30.

5. A composition of matter comprising chocolate and as a bloom inhibitor a mixture of a lipophilic partial ester of a fatty acid containing from 12 to 18 carbon atoms with a hexitan and a hydrophilic compound of the formula:

$$R(OC_2H_4)_zOH$$

wherein:

R is an acyl radical containing from 12 to 18 carbon atoms, and z is a number from 6 to 30.

6. The composition of matter as described in claim 5 wherein the lipophilic partial ester is a sorbitan stearate.

7. The composition of matter as described in claim 6 wherein the lipophilic partial ester is sorbitan mono-stearate.

8. The composition of matter as described in claim 6 wherein the lipophilic partial ester is sorbitan di-stearate.

9. The composition of matter as described in claim 6 wherein the lipophilic partial ester is sorbitan tri-stearate.

10. The composition of matter as described in claim 5 wherein the lipophilic partial ester is a sorbitan oleate.

11. The composition of matter as defined in claim 6 wherein the hydrophilic compound is a polyoxyethylene stearate.

12. The composition of matter as defined in claim 7 wherein the hydrophilic compound is a polyoxyethylene stearate.

13. The composition of matter as described in claim 8 wherein the hydrophilic compound is a polyoxyethylene stearate.

14. The composition of matter as described in claim 9 wherein the hydrophilic compound is a polyoxyethylene stearate.

15. The composition of matter as described in claim 11 wherein the polyoxyethylene stearate is 8 polyoxyethylene stearate.

16. The composition of matter as described in claim 12 wherein the polyoxyethylene stearate is 8 polyoxyethylene stearate.

17. The composition of matter as described in claim 13 wherein the polyoxyethylene stearate is 8 polyoxyethylene stearate.

18. The composition of matter as described in claim 14 wherein the polyoxyethylene stearate is 8 polyoxyethylene stearate.

19. The composition of matter as described in claim 5 wherein the hydrophilic compound is a di-stearate.

SHERWOOD THOMAS CROSS.

REFERENCES CITED

The following references are of record in the file of this patent:

UNITED STATES PATENTS

| Number | Name | Date |
| --- | --- | --- |
| 2,422,486 | Johnston | June 17, 1947 |
| 2,539,518 | Mayberry | Jan. 30, 1951 |